United States Patent
Kim

(10) Patent No.: US 10,077,820 B2
(45) Date of Patent: Sep. 18, 2018

(54) STRUCTURE OF SEMI-ACTIVE MOUNT

(71) Applicant: Hyundai Motor Company, Seoul (KR)

(72) Inventor: Jang-Ho Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 3 days.

(21) Appl. No.: 15/290,836

(22) Filed: Oct. 11, 2016

(65) Prior Publication Data

US 2017/0276208 A1    Sep. 28, 2017

(30) Foreign Application Priority Data

Mar. 28, 2016 (KR) ........................ 10-2016-0036542

(51) Int. Cl.
| | |
|---|---|
| *F16F 13/26* | (2006.01) |
| *F16F 13/10* | (2006.01) |
| *B60K 5/12* | (2006.01) |

(52) U.S. Cl.
CPC ............ *F16F 13/26* (2013.01); *B60K 5/1283* (2013.01); *F16F 13/10* (2013.01)

(58) Field of Classification Search
CPC .. F16F 13/10; F16F 13/14; F16F 13/18; F16F 13/26; F16F 13/28; F16F 13/30; F16F 13/101; F16F 13/262; F16F 13/264; F16F 13/268; F16F 13/1418; B60K 5/1208; B60K 5/1283
USPC .... 267/140.14, 140.11, 140.13, 140.15, 121, 267/122

See application file for complete search history.

(56) References Cited

U.S. PATENT DOCUMENTS

| | | | |
|---|---|---|---|
| 4,738,434 A | 4/1988 | Marjoram et al. | |
| 5,344,127 A * | 9/1994 | Hettler | F16F 13/26 267/140.13 |
| 5,911,412 A * | 6/1999 | Durand | F16F 13/26 267/140.13 |
| 6,244,578 B1 * | 6/2001 | Schwerdt | F16F 13/26 267/140.13 |
| 6,276,672 B1 * | 8/2001 | Rudolf | F16F 13/26 267/140.13 |

(Continued)

FOREIGN PATENT DOCUMENTS

| | | |
|---|---|---|
| JP | 2002-106628 A | 4/2002 |
| JP | 2004-76819 A | 3/2004 |

(Continued)

*Primary Examiner* — Robert Siconolfi
*Assistant Examiner* — San M Aung
(74) *Attorney, Agent, or Firm* — Morgan, Lewis & Bockius LLP

(57) ABSTRACT

A semi-active mount structure may include a nozzle plate mounted between an insulator and a diaphragm, to divide an interior of a main case into an upper fluid chamber and a lower fluid chamber, the nozzle plate being formed with first and second fluid passages, a plunger mounted in a housing coupled to a lower surface of the diaphragm such that the plunger is vertically movable, the plunger opening or closing the second fluid passage in accordance with application of electric power to a coil, a valve spring disposed between the plunger and the housing, to apply elastic force to the plunger, the valve spring dividing a space defined between the diaphragm and the coil into an upper space and a lower space, and a valve mounted at a vent hole drilled at one side of the housing for air to be introduced into or discharged from the lower space.

11 Claims, 5 Drawing Sheets

(56) References Cited

U.S. PATENT DOCUMENTS

| | | | | |
|---|---|---|---|---|
| 2001/0010413 A1* | 8/2001 | Takashima | .............. | F16F 13/26 267/140.13 |
| 2003/0011116 A1* | 1/2003 | Kodama | ................. | F16F 13/26 267/140.13 |
| 2003/0011117 A1* | 1/2003 | Nishi | ................... | F16F 13/268 267/140.14 |
| 2003/0030203 A1* | 2/2003 | Nemoto | ................. | F16F 13/26 267/140.14 |

FOREIGN PATENT DOCUMENTS

| | | |
|---|---|---|
| JP | 2005-188581 A | 7/2005 |
| JP | 2005-240872 A | 9/2005 |
| JP | 2006-9868 A | 1/2006 |
| JP | 2006-55767 A | 3/2006 |
| JP | 2006-250179 A | 9/2006 |
| KR | 10-2005-0123274 A | 12/2005 |
| KR | 10-1565051 B1 | 11/2015 |

* cited by examiner

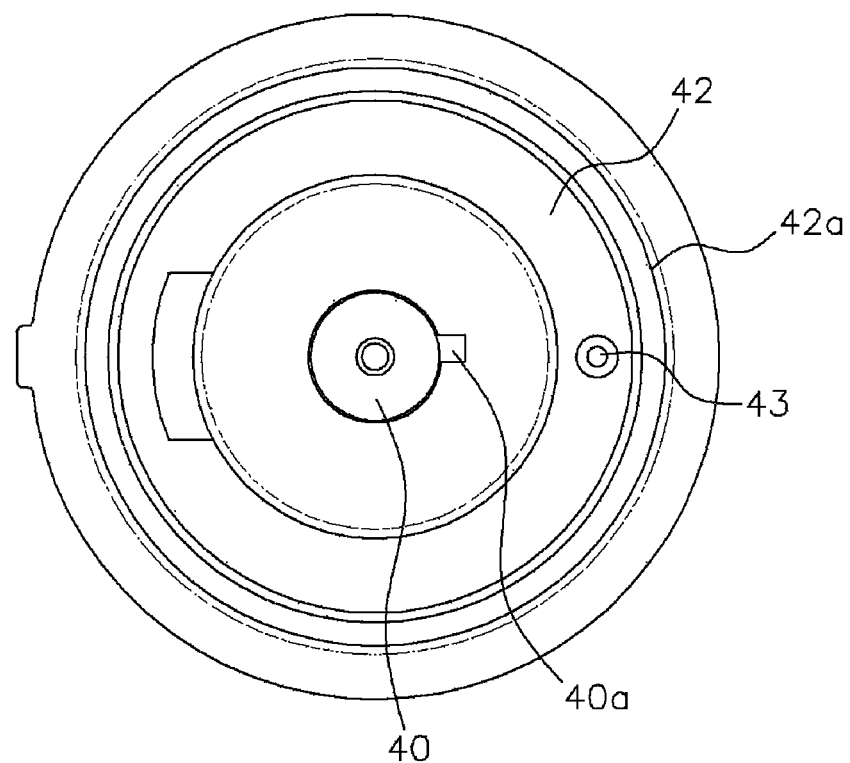

STRUCTURE OF SEMI-ACTIVE MOUNT

CROSS-REFERENCE TO RELATED APPLICATION

The present application claims priority to Korean Patent Application No. 10-2016-0036542, filed Mar. 28, 2016, the entire contents of which is incorporated herein for all purposes by this reference.

BACKGROUND OF THE INVENTION

Field of the Invention

The present invention relates to a structure of a semi-active mount exhibiting mount characteristics varying in accordance with application of current, and more particularly to a semi-active mount structure including a valve for opening or closing a vent hole, not only to seal a lower space of a valve spring when a plunger does not operate, thereby increasing rigidity of the valve spring, but also to open the lower space when the plunger operates, thereby decreasing rigidity of the valve spring.

Description of Related Art

To address continuing development of vehicle technologies and increasing consumer demand for low vibration and low noise, efforts to maximize ride comfort through analysis of noise, vibration and harshness generated in vehicles, namely, NVH performance, are being made.

Engine vibration generated in a specific RPM range during driving of a vehicle is transferred to a passenger compartment via a vehicle body while having a specific frequency. Phenomena exhibited due to explosion occurring in an engine have predominant influence on the passenger compartment.

To this end, an engine mount is mounted between the engine and a vehicle body in order to attenuate noise and vibration transferred from the engine while supporting the engine. Engine mounts are mainly classified into rubber mounts, air damping mounts, and hydraulic mounts.

The hydraulic mount has a structure in which a certain amount of fluid (hydraulic fluid) is sealed in an interior of the hydraulic mount, to generate a damping force in accordance with flow thereof between an upper fluid chamber and a lower fluid chamber. The hydraulic mount has an advantage in that it may be possible to attenuate both high-frequency vibration and low-frequency vibration in accordance with vehicle driving conditions.

Meanwhile, an active mount or a semi-active mount, which is capable of actively vertically moving an actuating plate, has recently been developed in order to improve vibration insulating characteristics of the hydraulic mount.

The semi-active mount is configured to control characteristics thereof in an ON/OFF manner. As such a semi-active mount, a volume-stiffness type semi-active mount or a bypass type semi-active mount is widely used. The volume-stiffness type semi-active mount is configured to control behavior of a membrane. The bypass type semi-active mount is additionally formed with a second flow passage to connect upper and lower fluid chambers such that the connection between the upper and lower fluid chambers is allowed or prevented.

In the case of a conventional bypass type semi-active mount, a nozzle plate is mounted between an insulator and a diaphragm, to divide an interior of the mount into an upper fluid chamber and a lower fluid chamber. In addition, a first fluid passage having an annular shape and a second fluid passage having a small length and a great cross-sectional area are formed at the nozzle plate.

Flow of a fluid (hydraulic fluid) is carried out in accordance with an increase or decrease in the inner volume of the upper fluid chamber occurring as the insulator is elastically deformed due to shift of load and vibration transferred from an engine. During flow of the fluid, vibration transferred to a vehicle body is attenuated.

A plunger is installed beneath the diaphragm. The plunger is vertically moved in accordance with application of electric power to a coil thereof. When the plunger moves upwards, the second fluid passage is closed. On the other hand, when the plunger moves downwards, the second fluid passage is opened.

The semi-active mount having the above-mentioned configuration operates to vary characteristics thereof in accordance with vehicle driving conditions by opening the second fluid passage, which has been closed, when the engine is in an idling state, and closing the second fluid passage during driving of the engine.

However, the conventional semi-active mount has inconsistencies in that the plunger should be firmly supported during driving of the vehicle in order to maintain the second fluid passage in a closed state because the fluid should be prevented from passing through the second fluid passage even when great shift of a power train occurs due to a bump or the like, whereas the plunger should be non-firmly (weakly) supported during idling of the vehicle because the second fluid should be easily opened.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a semi-active mount structure including a valve spring, and a valve, which is closed in a closed state of a second fluid passage such that a lower space of the valve spring is sealed to function as an air spring, thereby increasing rigidity of the valve spring, while being opened in an opened state of the second fluid passage such that air is freely introduced into or discharged from the lower space, thereby decreasing rigidity of the valve spring.

Additionally, various aspects of the present invention are directed to providing a semi-active mount structure including a valve spring, and a valve for opening or sealing the valve spring, the valve being opened or closed, simply using operation of a plunger, thereby being capable of providing advantages in terms of manufacturing costs and weight.

According to various aspects of the present invention, a semi-active mount structure may include a nozzle plate mounted between an insulator and a diaphragm, to divide an interior of a main case into an upper fluid chamber and a lower fluid chamber, the nozzle plate being formed with first and second fluid passages to guide flow of a fluid, a plunger mounted in a housing coupled to a lower surface of the diaphragm such that the plunger is vertically movable in the housing, the plunger opening or closing the second fluid passage in accordance with application of electric power to a coil for powering the plunger, a valve spring disposed between the plunger and the housing, to apply elastic force to the plunger, the valve spring dividing a space defined between the diaphragm and the coil into an upper space and a lower space, and a valve mounted at a vent hole drilled at one side of the housing for air to be introduced into or discharged from the lower space, the valve opening or closing the vent hole.

The valve may close the vent hole when the plunger closes the second fluid passage in accordance with non-application of the electric power to the coil, and may operate when the plunger moves vertically in accordance with the application of electric power to the coil, thereby opening the vent hole.

The plunger may include, at one side thereof, a protrusion having an inclined surface, and the valve may include a valve member connected to the housing via a spring such that the valve member is slidable, the valve member having a valve hole, and a slider coupled to one side of the valve member, the slider having an inclined surface slidably contacting the inclined surface of the protrusion of the plunger.

The valve hole of the valve member and the vent hole of the housing may be spaced apart from each other, and may be selectively aligned with each other as the protrusion of the plunger pushes against the slider to slide the valve member.

The plunger may include, at one side thereof, a protrusion having an inclined surface, and the valve may include a valve body pivotably mounted to a bottom surface of the housing, an extension extending from a first side of the valve body while having an inclined surface slidably contacting the protrusion of the plunger, and an elastic member extending from a second side of the valve body with a free end contacting a circumferential edge of the housing, to apply a return force to the valve body.

The vent hole of the housing may be normally closed by the valve body, and may be opened as the protrusion of the plunger pushes against the extension to pivot the valve body.

The valve may further include a valve hole formed through the valve body and spaced apart from the vent hole of the housing, and the valve hole may be selectively overlapped with the vent hole as the protrusion of the plunger pushes against the extension to pivot the valve body.

In accordance with the above-described configuration of various embodiments the present invention, the valve installed at the vent hole closes the vent hole, thereby sealing the lower space of the valve spring. In this state, the lower space functions as an air spring and, as such, there is an effect of increasing rigidity of the valve spring.

Accordingly, during driving of the vehicle, the plunger firmly closes the second fluid passage and, as such, there is an effect of preventing flow of the fluid through the second fluid passage even when great shift of a power train occurs due to a bump or the like.

In addition, when the plunger operates, the valve is opened, thereby allowing air to be freely introduced into or discharged from the lower space. In this state, accordingly, there is an effect of decreasing rigidity of the valve spring.

As a result, resistance against operation of the valve spring is decreased. Accordingly, it may be possible to use a coil having a reduced capacity, and thus, to reduce the overall size of the mount. Furthermore, current consumption may be reduced. In addition, response speed to operation of the plunger may be increased.

Moreover, the valve may be opened or closed by simply using operation of the plunger without being controlled by any complicated structure. Accordingly, there are advantages in terms of manufacturing costs and weight.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a bottom view illustrating a plunger and the vent hole according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
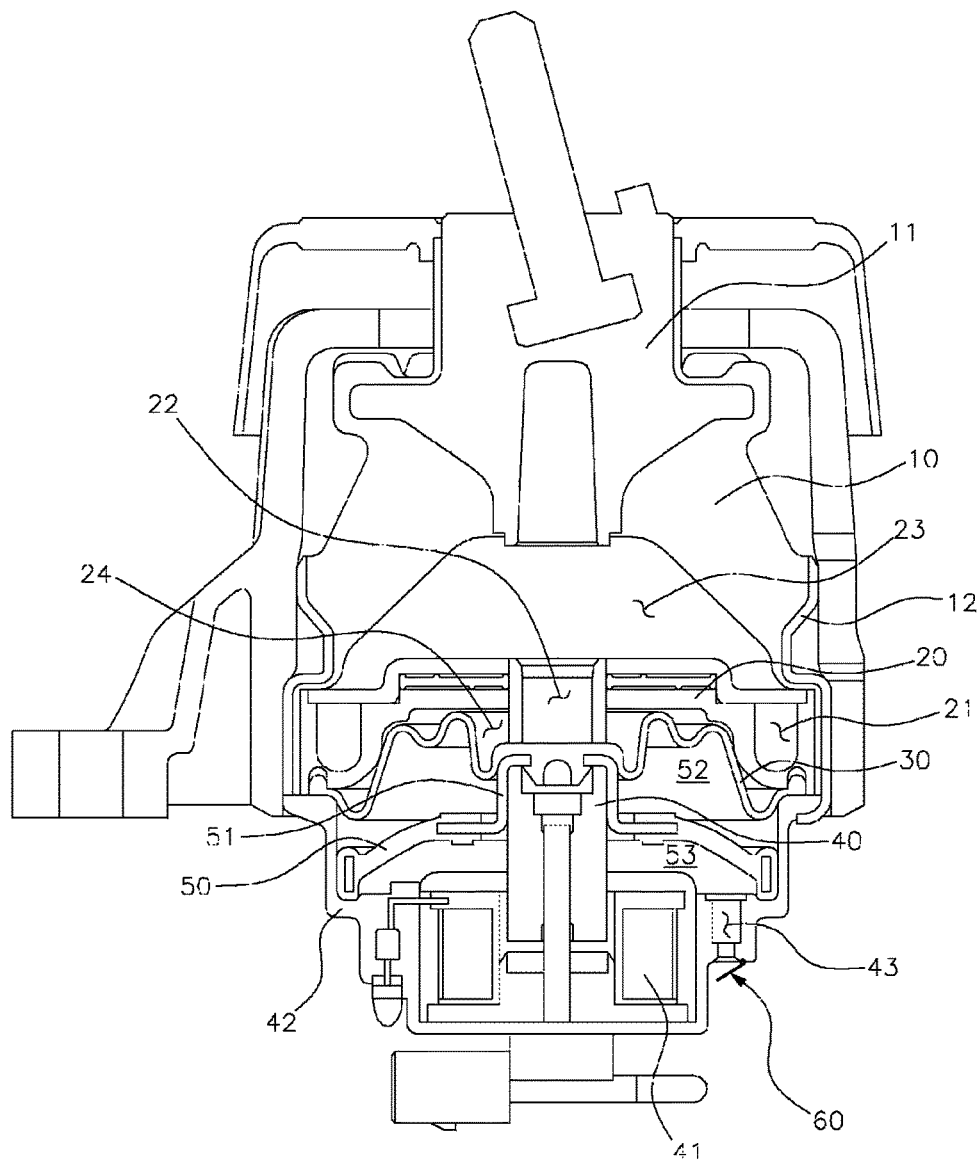
FIG. 1 is a longitudinal sectional view illustrating a structure of a semi-active mount according to various embodiments of the present invention.

FIG. 1 is a longitudinal sectional view illustrating a structure of a semi-active mount according to various embodiments of the present invention.

As illustrated in FIG. 1, the semi-active mount structure includes an insulator 10 molded around an inner core 11 through a shaping process, a nozzle plate 20 mounted between the insulator 10 and a diaphragm 30, a plunger 40 vertically movable in accordance with application of electric power to a coil 41, a valve spring 50 for applying elastic force to the plunger 40, and a valve 60 for opening/closing a vent hole 43 drilled at one side of a housing 42.

The nozzle plate 20 defines an interior of a main case 12 into an upper fluid chamber 23 and a lower fluid chamber 24. The nozzle plate 20 has a structure including a first fluid passage 21 formed along a circumference of the nozzle plate 20 while having an annular shape, and a second fluid passage 22 extending vertically.

The second fluid passage 22 has a shorter length and a greater cross-sectional area than the first fluid passage 21. When the insulator 10 is elastically deformed in accordance with transfer of load from an engine to the inner core 11, the inner volume of the upper fluid chamber 23 is increased, thereby causing a fluid (hydraulic fluid) to be introduced into the lower fluid chamber 24 after passing through the first fluid passage 21 or the second fluid passage 22. As a result, vibration attenuation is achieved.

The housing 42 is coupled to a lower surface of the diaphragm 30. The housing 42 accommodates therein elements for opening/closing the second fluid passage 22, for example, the coil 41, the plunger 40 and the valve spring 50.

The valve spring 50, which is integrated with the plunger 40 or is connected to the plunger 40 via a plate 51, applies elastic force to the plunger 40 such that the plunger 40 is pressed upwards. Accordingly, the plunger 40 always closes the second fluid passage 22, so long as no electric power is applied to the coil 41.

Under general driving conditions of the vehicle, the second fluid passage 22 is maintained in a closed state, thereby preventing the fluid from passing therethrough. On the other hand, under idling conditions of the vehicle, the second fluid passage 22 is maintained in an opened state, thereby lowering dynamic characteristics of idling excitation frequencies.

The valve spring 50 has a disc shape. The valve spring 50 is fitted, at a circumferential edge thereof, in a circumferential groove formed at an inner surface of the housing 42 and, as such, is bent to form an inverted-U shape. The valve spring 50 divides an inner space between the diaphragm 30 and the coil 41 into an upper space 52 and a lower space 53. Volumes of the upper and lower spaces 52 and 53 are varied in accordance with behavior of the valve spring 50 caused by upward or downward movement of the plunger 40. As a result, introduction or discharge of air through the vent hole 43 drilled at one side of the housing 42 is carried out.

A filter to filter off dust may be additionally mounted in the vent hole 43. The valve 60 is installed at a lower end of the vent hole 43, to allow or prevent introduction or discharge of air through the vent hole 43.

In detail, the valve 60 closes the vent hole 43 when no electric power is applied to the coil 41 and, as such, the plunger 40 closes the second fluid passage 22 by the elastic force of the valve spring 50. On the other hand, when the plunger 40 operates in accordance with application of electric power to the coil 41, the valve 60 operates to open the vent hole 43.

When the valve 60 is in a closed state, the lower space 53 of the valve spring 50 is sealed and, as such, functions as an air spring. In this case, accordingly, there is an effect of increasing rigidity of the valve spring 50. On the other hand, when the valve 60 is in an opened state, the lower space 53 of the valve spring 50 is opened to allow free introduction or discharge of air thereinto or therefrom. In this case, accordingly, there is an effect of achieving easy movement of the valve spring 50 (decreasing rigidity of the valve spring 50).

Thus, in accordance with various embodiments of the present invention, the valve 60 is configured to be mechanically opened or closed by simply using operation of the plunger 40 without being controlled by any complicated structure. Accordingly, there are advantages in terms of manufacturing costs and weight.

Figure 2A:
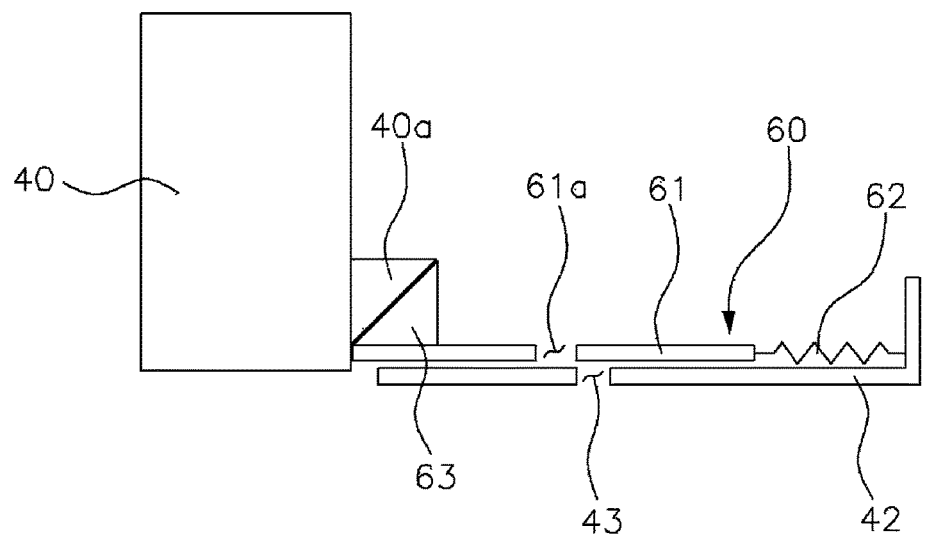
FIG. 2A is a view briefly illustrating a state in which a vent hole is closed by a valve according to various embodiments of the present invention.
Figure 2B:
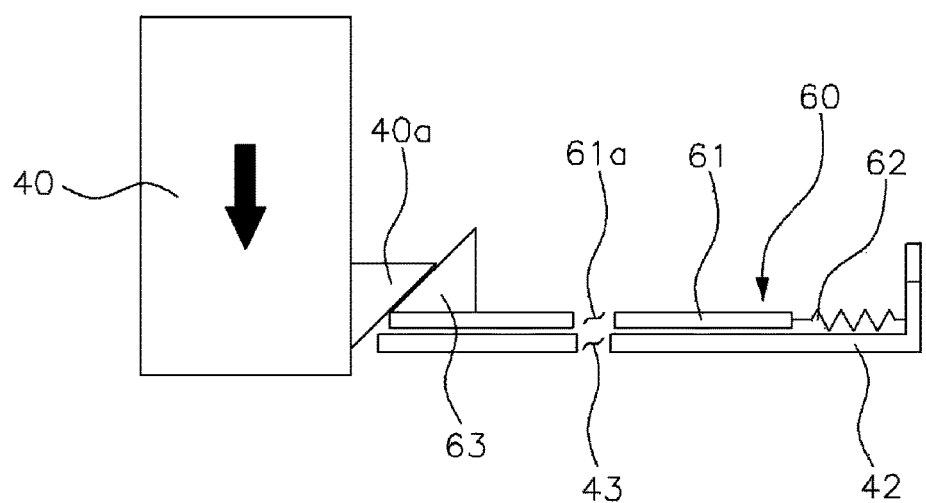
FIG. 2B is a view briefly illustrating a state in which the vent hole is opened by the valve according to various embodiments of the present invention.

FIG. 2A is a view briefly illustrating a state in which the vent hole is closed by the valve according to various embodiments of the present invention. FIG. 2B is a view briefly illustrating a state in which the vent hole is opened by the valve according to various embodiments of the present invention.

As illustrated in FIGS. 2A and 2B, in various embodiments of the present invention, a protrusion 40a having an inclined surface is formed at one side of the plunger 40. The valve 60 includes a valve member 61 connected to the housing 42 via a spring 62 such that the valve member 61 is slidable, and a slider 63 coupled to one side of the valve member 61.

The valve member 61 has a slidable plate shape. The valve member 61 is formed with a valve hole 61a, to open or close the vent hole 43. The slide 63 is formed with an inclined surface slidably contacting the inclined surface of the protrusion 40a in the plunger 40.

As illustrated in FIG. 2A, when the plunger 40 is in an initial state in which the plunger 40 closes the second fluid passage 22 or in a returned state in which the plunger 40 is returned to an original position to close the second fluid passage 22, the protrusion 40a is in contact with the slider 63 such that the inclined surface of the protrusion 40a completely overlaps the inclined surface of the slider 63. In this state, the valve hole 61a is spaced apart from the vent hole 43. Accordingly, the vent hole 43 is maintained in a closed state by the valve member 61 and, as such, the lower space 53 of the valve spring 50 is sealed to function as an air spring.

As illustrated in FIG. 2B, when the plunger 40 operates in accordance with application of electric power to the coil 41, the protrusion 40a pushes the slider 63, to slide the valve member 61 (to the right). As a result, the valve hole 61a is aligned with the vent hole 43, thereby opening the vent hole 43. Accordingly, the lower space 53 of the valve spring 50 is opened and, as such, the plunger 40 is more easily movable in a vertical direction.

Figure 4A:
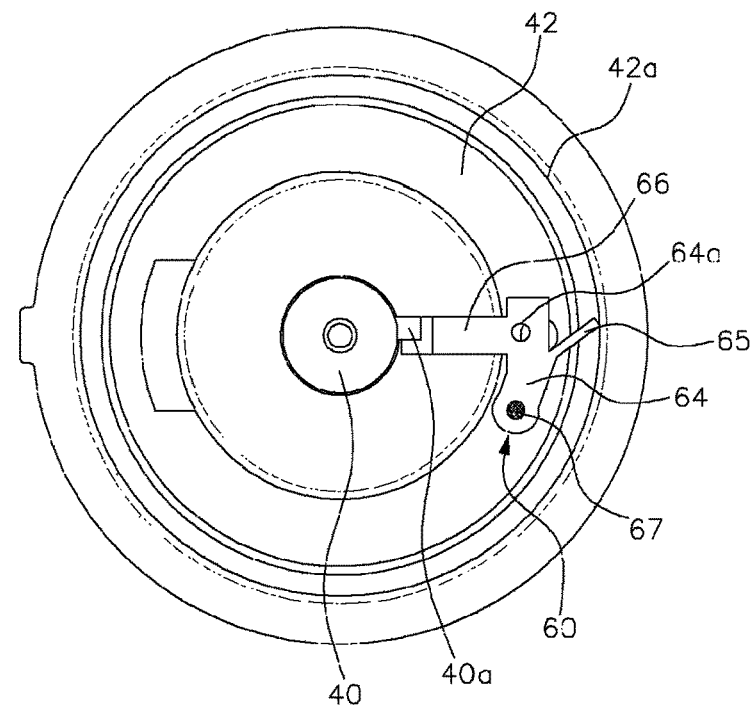
FIG. 4A is a view briefly illustrating a state in which the vent hole is closed by a valve according to v of the present invention.
Figure 4B:
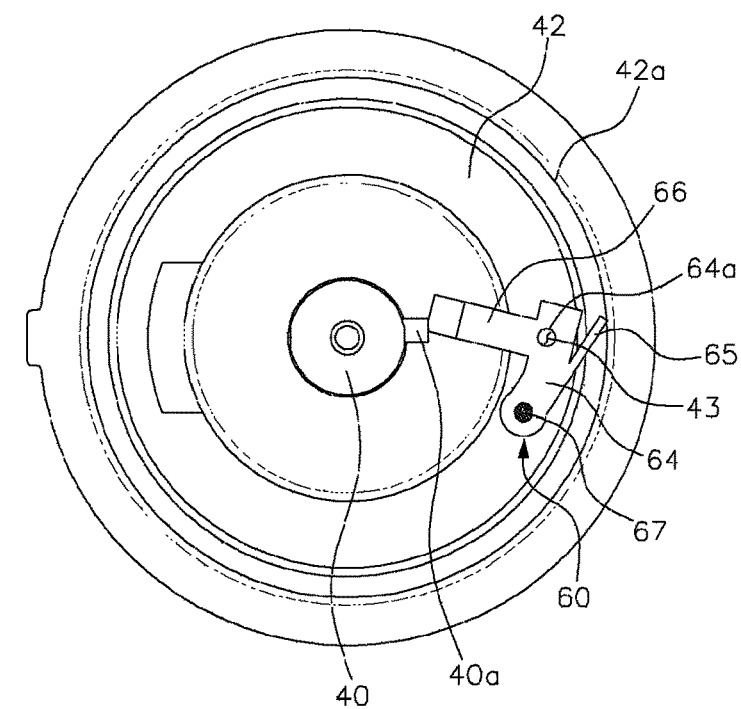
FIG. 4B is a view briefly illustrating a state in which the vent hole is opened by the valve according to the various embodiments of FIG. 4A.

FIG. 3 is a bottom view illustrating the plunger and vent hole according to various embodiments of the present invention. FIG. 4A is a view briefly illustrating a state in which the vent hole is closed by a valve according to various embodiments of the present invention. FIG. 4B is a view briefly illustrating a state in which the vent hole is opened by the valve according to the various embodiments of FIG. 4A.

As illustrated in FIG. 3, and FIGS. 4A and 4B, in the illustrated embodiment of the present invention, a protrusion 40a having an inclined surface is formed at one side of the plunger 40. In addition, the valve 60 includes a valve body 64 mounted to a bottom surface of the housing 42, to be pivotable about a hinge 67, an extension 66 extending from one side of the valve body 64 while having an inclined surface slidably contacting the protrusion 40a of the plunger 40, and an elastic member 65 extending from the other side of the valve body 64 while having a free end contacting a circumferential edge 42a of the housing 42, to apply a return force to the valve body 64. The valve body 64 is additionally formed with a valve hole 64a spaced apart from the vent hole 43 formed at the housing 42, to open or close the vent hole 43.

The valve body 64 of the valve device according to the various embodiments of FIGS. 4A and 4B differs from the valve member 61 of the valve device according to the various embodiments of FIGS. 2A and 2B in that the valve body 64 is mounted to be pivotable about the hinge 67.

As illustrated in FIG. 4A, when the plunger 40 is in an initial state or in a returned state, the protrusion 40a of the plunger 40 is in contact with the extension 66 such that the inclined surface of the protrusion 40a completely overlaps the inclined surface of the extension 66. In this state, the valve hole 64a is spaced apart from the vent hole 43. Accordingly, the vent hole 43 is maintained in a closed state by the valve body 64 and, as such, the lower space 53 of the valve spring 50 is sealed.

As illustrated in FIG. 4B, when the plunger 40 operates, the protrusion 40a of the plunger 40 pushes the extension 66, to pivot the valve body 64 (clockwise in the illustrated case). As a result, the valve hole 64a is aligned with the vent hole 43, thereby opening the vent hole 43. Accordingly, the lower space 53 of the valve spring 50 is opened and, as such, air is freely introduced into or discharged from the lower space 53.

Figure 5A:
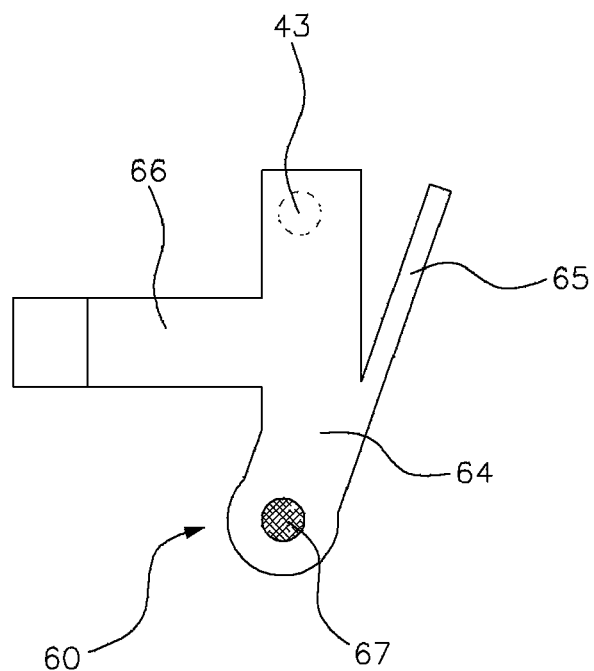
FIG. 5A is a view briefly illustrating a state in which the vent hole is closed by a valve according to various embodiments of the present invention.
Figure 5B:
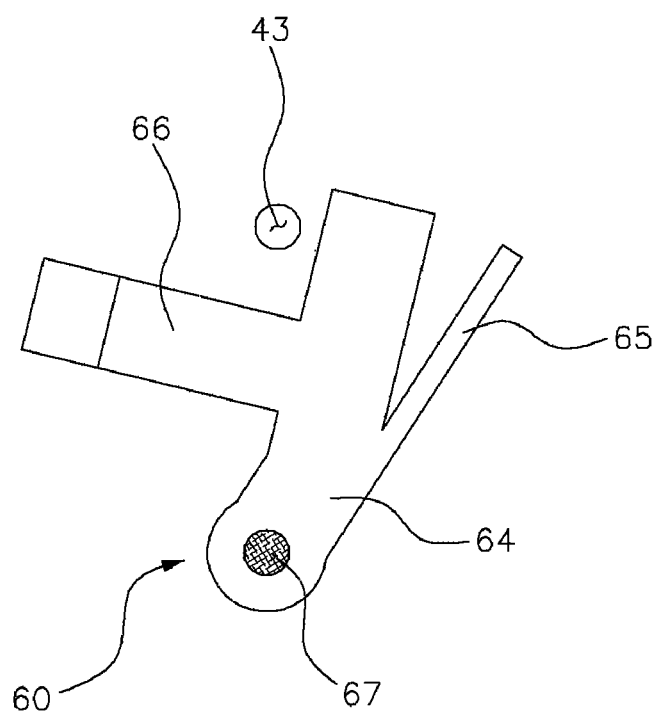
FIG. 5B is a view briefly illustrating a state in which the vent hole is opened by the valve according to the various embodiments of FIG. 5A.

FIG. 5A is a view briefly illustrating a state in which the vent hole is closed by a valve according to another embodiment of the present invention. FIG. 5B is a view briefly illustrating a state in which the vent hole is opened by the valve according to the various embodiments of FIG. 5A.

As illustrated in FIGS. 5A and 5B, in the various embodiments of the present invention, the valve hole 64a is eliminated from the valve body 64. Opening or closing of the vent hole 43 is achieved in accordance with adjustment of the shape or size of the valve body 64.

That is, as illustrated in FIG. 5A, when the plunger 40 is in an initial state or in a returned state, the valve body 64 closes the vent hole 43 formed at the housing 42 and, as such, the lower space 53 of the valve spring 50 is sealed.

As illustrated in FIG. 5B, when the plunger 40 operates, the valve body 64 pivots clockwise, thereby opening the vent hole 43. Accordingly, the lower space 53 of the valve spring 50 is opened and, as such, air is freely introduced into or discharged from the lower space 53.

In the above-described configuration according to the various embodiments of the present invention, the valve 60 installed at the vent hole 43 closes the vent hole 43, thereby sealing the lower space 53 of the valve spring 50. In this state, the lower space 53 functions as an air spring and, as such, there is an effect of increasing rigidity of the valve spring 50. In addition, during driving of the vehicle, the plunger 40 firmly closes the second fluid passage 22 and, as such, there is an effect of preventing flow of the fluid through the second fluid passage even when great shift of a power train occurs due to a bump or the like.

On the other hand, when the plunger 40 operates, the valve 60 is opened, thereby allowing air to be freely introduced into or discharged from the lower space 53. In this state, accordingly, there is an effect of decreasing rigidity of the valve spring 50. That is, resistance against operation of the valve spring 50 is decreased. Accordingly, it may be possible to use a coil having a reduced capacity as the coil 41, and, thus, to reduce the overall size of the mount. Furthermore, current consumption may be reduced. In addition, response speed to operation of the plunger 40 may be increased.

Moreover, the valve 60 may be opened or closed by simply using operation of the plunger 40 without being controlled by any complicated structure. Accordingly, there are advantages in terms of manufacturing costs and weight.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A semi-active mount structure comprising:
   a nozzle plate mounted between an insulator and a diaphragm, to divide an interior of a main case into an upper fluid chamber and a lower fluid chamber, the nozzle plate being formed with first and second fluid passages to guide flow of a fluid;
   a plunger mounted in a housing coupled to a lower surface of the diaphragm such that the plunger is vertically movable in the housing, the plunger opening or closing the second fluid passage in accordance with application of electric power to a coil for powering the plunger;
   a valve spring disposed between the plunger and the housing, to apply elastic force to the plunger, the valve spring dividing a space defined between the diaphragm and the coil into an upper space and a lower space; and
   a valve mounted at a vent hole drilled at one side of the housing for air to be introduced into or discharged from the lower space, the valve opening or closing the vent hole,
   wherein the valve closes the vent hole when the plunger closes the second fluid passage in accordance with non-application of the electric power to the coil, and operates when the plunger moves vertically in accordance with the application of electric power to the coil, thereby opening the vent hole.

2. The semi-active mount structure according to claim 1, wherein:
   the plunger includes, at one side thereof, a protrusion having an inclined surface; and
   the valve comprises:
      a valve member connected to the housing via a spring such that the valve member is slidable, the valve member having a valve hole; and
      a slider coupled to one side of the valve member, the slider having an inclined surface slidably contacting the inclined surface of the protrusion of the plunger.

3. The semi-active mount structure according to claim 2, wherein the valve hole of the valve member and the vent hole of the housing are spaced apart from each other, and are selectively aligned with each other as the protrusion of the plunger pushes against the slider to slide the valve member.

4. The semi-active mount structure according to claim 1, wherein:
the plunger includes, at one side thereof, a protrusion having an inclined surface; and
the valve comprises:
a valve body pivotably mounted to a bottom surface of the housing;
an extension extending from a first side of the valve body while having an inclined surface slidably contacting the protrusion of the plunger; and
an elastic member extending from a second side of the valve body with a free end contacting a circumferential edge of the housing, to apply a return force to the valve body.

5. The semi-active mount structure according to claim 4, wherein the vent hole of the housing is normally closed by the valve body, and is opened as the protrusion of the plunger pushes against the extension to pivot the valve body.

6. The semi-active mount structure according to claim 4, wherein:
the valve further comprises a valve hole formed through the valve body and spaced apart from the vent hole of the housing; and
the valve hole is selectively overlapped with the vent hole as the protrusion of the plunger pushes against the extension to pivot the valve body.

7. A semi-active mount structure comprising:
a nozzle plate mounted between an insulator and a diaphragm, to divide an interior of a main case into an upper fluid chamber and a lower fluid chamber, the nozzle plate being formed with first and second fluid passages to guide flow of a fluid;
a plunger mounted in a housing coupled to a lower surface of the diaphragm such that the plunger is vertically movable in the housing, the plunger opening or closing the second fluid passage in accordance with application of electric power to a coil for powering the plunger;
a valve spring disposed between the plunger and the housing, to apply elastic force to the plunger, the valve spring dividing a space defined between the diaphragm and the coil into an upper space and a lower space; and
a valve mounted at a vent hole drilled at one side of the housing for air to be introduced into or discharged from the lower space, the valve opening or closing the vent hole,
wherein the plunger includes, at one side thereof, a protrusion having an inclined surface; and
wherein the valve comprises:
a valve member connected to the housing via a spring such that the valve member is slidable, the valve member having a valve hole; and
a slider coupled to one side of the valve member, the slider having an inclined surface slidably contacting the inclined surface of the protrusion of the plunger.

8. The semi-active mount structure according to claim 7, wherein the valve hole of the valve member and the vent hole of the housing are spaced apart from each other, and are selectively aligned with each other as the protrusion of the plunger pushes against the slider to slide the valve member.

9. A semi-active mount structure comprising:
a nozzle plate mounted between an insulator and a diaphragm, to divide an interior of a main case into an upper fluid chamber and a lower fluid chamber, the nozzle plate being formed with first and second fluid passages to guide flow of a fluid;
a plunger mounted in a housing coupled to a lower surface of the diaphragm such that the plunger is vertically movable in the housing, the plunger opening or closing the second fluid passage in accordance with application of electric power to a coil for powering the plunger;
a valve spring disposed between the plunger and the housing, to apply elastic force to the plunger, the valve spring dividing a space defined between the diaphragm and the coil into an upper space and a lower space; and
a valve mounted at a vent hole drilled at one side of the housing for air to be introduced into or discharged from the lower space, the valve opening or closing the vent hole,
wherein the plunger includes, at one side thereof, a protrusion having an inclined surface; and
wherein the valve comprises:
a valve body pivotably mounted to a bottom surface of the housing;
an extension extending from a first side of the valve body while having an inclined surface slidably contacting the protrusion of the plunger; and
an elastic member extending from a second side of the valve body with a free end contacting a circumferential edge of the housing, to apply a return force to the valve body.

10. The semi-active mount structure according to claim 9, wherein the vent hole of the housing is normally closed by the valve body, and is opened as the protrusion of the plunger pushes against the extension to pivot the valve body.

11. The semi-active mount structure according to claim 9, wherein:
the valve further comprises a valve hole formed through the valve body and spaced apart from the vent hole of the housing; and
the valve hole is selectively overlapped with the vent hole as the protrusion of the plunger pushes against the extension to pivot the valve body.

* * * * *